(12) United States Patent
Kim (10) Patent No.: US 10,926,612 B2
(45) Date of Patent: Feb. 23, 2021

(54) DOOR CURTAIN ASSEMBLY HAVING VARIABLE SCREENING RATE STRUCTURE

(71) Applicants: Hyundai Motor Company, Seoul (KR); Kia Motors Corporation, Seoul (KR)

(72) Inventor: Do-Won Kim, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 273 days.

(21) Appl. No.: 16/162,665

(22) Filed: Oct. 17, 2018

(65) Prior Publication Data

US 2019/0381867 A1    Dec. 19, 2019

(30) Foreign Application Priority Data

Jun. 19, 2018   (KR) .......................... 10-2018-0070377

(51) Int. Cl.
  *B60J 1/20*   (2006.01)
(52) U.S. Cl.
  CPC ............ *B60J 1/2069* (2013.01); *B60J 1/203* (2013.01); *B60J 1/2033* (2013.01); *B60J 1/2044* (2013.01); *B60J 1/2047* (2013.01); *B60J 1/2083* (2013.01)
(58) Field of Classification Search
  CPC ... B60J 1/20; B60J 1/203; B60J 1/2011; B60J 1/2016; B60J 1/2033; B60J 1/2041; B60J 1/2044; B60J 1/2047; B60J 1/2062; B60J 1/2063; B60J 1/2069; B60J 1/2083; B60J 1/2086; B60J 3/02; B60J 3/0286; A47H 23/04; A47H 5/02; E06B 2009/2405; E06B 2009/2452; E06B 2009/2477
  See application file for complete search history.

(56) References Cited

U.S. PATENT DOCUMENTS 8,646,828 B2 * 2/2014 Haase ........................ B60J 5/00
                                                        296/97.9
9,506,291 B2 * 10/2016 Lin ........................... E06B 9/78
(Continued)

FOREIGN PATENT DOCUMENTS

| JP | 09-221967 A | 8/1997 |
| JP | H 10-193973 A | 7/1998 |
| JP | H 10-338028 A | 12/1998 |

(Continued)

*Primary Examiner* — Johnnie A. Shablack
*Assistant Examiner* — Matthew Richard Shepherd
(74) *Attorney, Agent, or Firm* — Morgan, Lewis & Bockius LLP (57) ABSTRACT

A door curtain assembly having a variable screening rate structure may include an internal curtain provided to be wound in a door trim and having patterns; an external curtain provided to be wound in the door trim and having a plurality of patterns; a control knob to which an upper edge portion of the internal curtain and an upper edge portion of the external curtain are fixed, and which is configured to adjust the positions of the internal and external curtains so that a rate at which the patterns of the internal curtain and the patterns of the external curtain overlap with each other may be changed, whereby the screening rate may be adjusted; and a curtain hook disposed on an upper end portion of a door frame so that the control knob may be locked to the curtain hook.

9 Claims, 10 Drawing Sheets

(56) References Cited

U.S. PATENT DOCUMENTS

2002/0033616 A1    3/2002  Schlecht et al.
2019/0047381 A1*   2/2019  Lekar ........................ B60J 1/20

FOREIGN PATENT DOCUMENTS

| JP | H 11-34662 A | 2/1999 | | |
|---|---|---|---|---|
| JP | 2007-145316 A | 6/2007 | | |
| KR | 10-2008-0057213 A | 6/2008 | | |
| KR | 10-2014-0020479 A | 2/2014 | | |
| WO | WO2017137215 | * | 8/2017 | ................ B60J 1/20 |

* cited by examiner

DOOR CURTAIN ASSEMBLY HAVING VARIABLE SCREENING RATE STRUCTURE

CROSS-REFERENCE TO RELATED APPLICATIONS

The present application claims priority to Korean Patent Application No. 10-2018-0070377, filed on Jun. 19, 2018, the entire contents of which is incorporated herein for all purposes by this reference.

BACKGROUND OF THE INVENTION

Field of the Invention

The present invention relates to a door curtain for a vehicle, and more particularly, to a door curtain assembly having a variable screening rate structure configured such that a screening rate can be varied by adjusting a knob which is used to vertically move curtains and by changing a rate at which the curtains distanced from each other overlap each other.

Description of Related Art

In general, a door of a vehicle is provided with a window glass allowing light to transmit therethrough.

Furthermore, a door curtain may be disposed adjacent to the window glass of the door to reduce the amount of sunlight that enters the passenger compartment of the vehicle or prevent the passenger compartment from being exposed to the outside.

Figure 1:
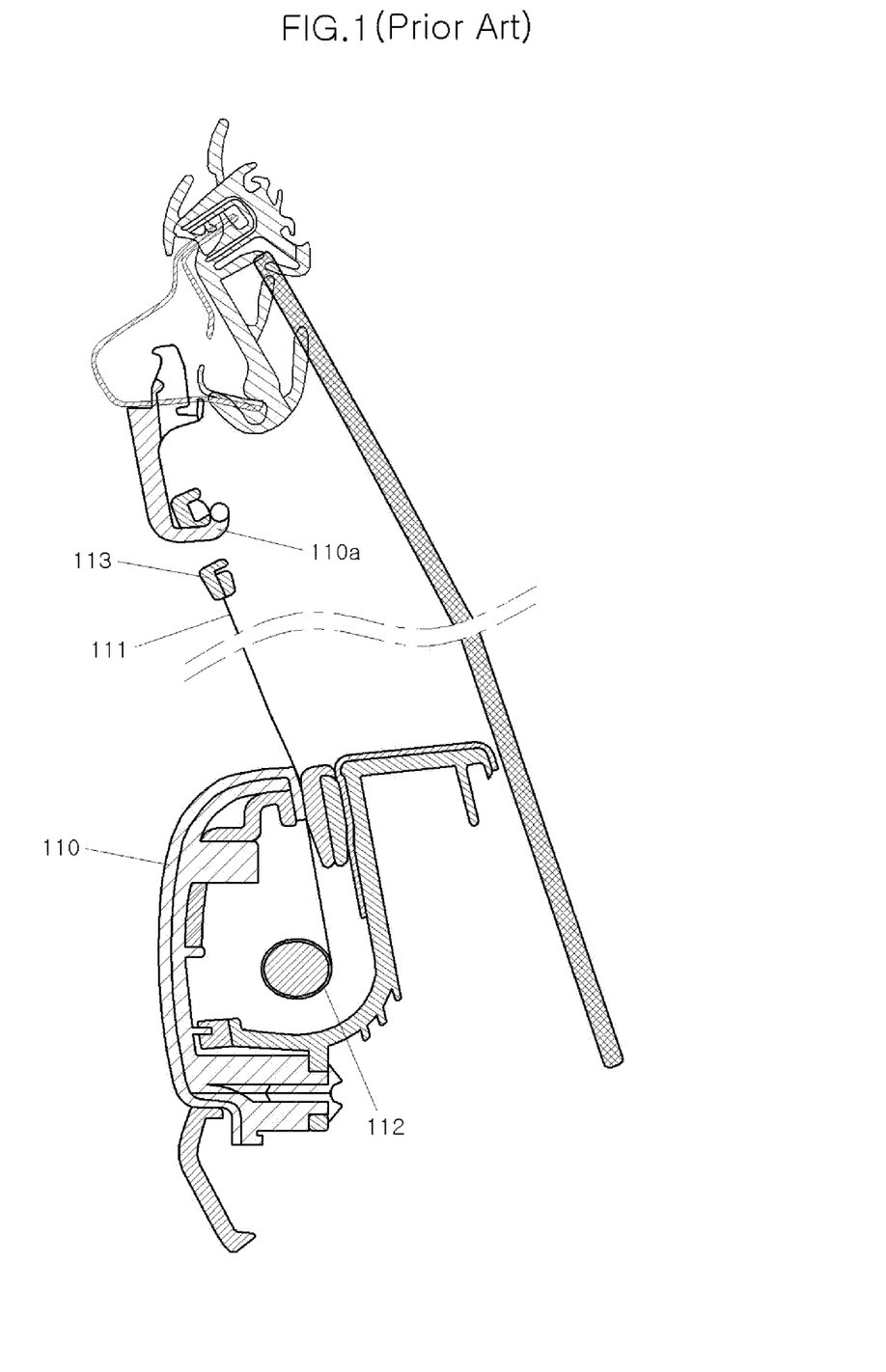
FIG. 1 is a sectional view illustrating a door curtain according to a conventional technique.

As shown in FIG. 1, a door curtain 111 according to a conventional technique is disposed in a door trim 110 and wound around a winding reel 112. An upper end bar 113 is provided on an upper edge portion of the door curtain 111. If an occupant pulls the upper end bar 113 to unwind the door curtain 111 from the winding reel 112 and then hooks the upper end bar 113 to a locking hook 110a provided on an upper portion of the door trim 110, the window glass is screened by the door curtain 111.

However, the door curtain 111 according to the conventional technique having the above-mentioned configuration is problematic in that a screening rate of the door curtain 111 cannot be adjusted because a pattern formed in the door curtain 111 cannot be changed.

In other words, it is impossible to change a light shielding rate depending on the intensity of sunlight or adjust the screening rate of the curtain such that the passenger compartment is invisible to an external person to secure the privacy of the occupant.

The information disclosed in the present Background of the Invention section is only for enhancement of understanding of the general background of the invention and may not be taken as an acknowledgement or any form of suggestion that the present information forms the prior art already known to a person skilled in the art.

BRIEF SUMMARY

Various aspects of the present invention are directed to providing a door curtain assembly having a variable screening rate structure in which double door curtains having a plurality of patterns are provided so that a screening rate of the door curtains can be controlled by adjusting a rate at which the patterns formed in the door curtains overlap each other.

Other various aspects of the present invention can be understood by the following description, and become apparent with reference to the exemplary embodiments of the present invention. Also, it is obvious to those skilled in the art to which the present invention pertains that the objects and advantages of the present invention can be realized by the means as claimed and combinations thereof.

In accordance with various exemplary embodiments of the present invention, there is provided a door curtain assembly having a variable screening rate structure, including: an internal curtain provided to be wound in a door trim of a vehicle, with a plurality of patterns formed in the internal curtain; an external curtain provided to be wound in the door trim of the vehicle and distanced from the internal curtain, with a plurality of patterns formed in the external curtain; a control knob to which an upper edge portion of the internal curtain and an upper edge portion of the external curtain are fixed at positions distanced from each other by a predetermined distance, the control knob being configured to adjust positions of the internal curtain and the external curtain so that a rate at which the patterns formed in the internal curtain and the patterns formed in the external curtain overlap with each other is changed, whereby a screening rate is adjusted; and a curtain hook disposed on an upper end portion of a door frame so that the control knob is locked to the curtain hook in an orientation selected among a plurality of orientations.

The patterns formed in the internal curtain may be identical with the patterns formed in the external curtain.

The patterns formed in each of the internal curtain and the external curtain may comprise patterns having different light transmittances and alternating with each other.

The upper edge portion of the internal curtain may be fixed to an internal curtain bar disposed in a longitudinal direction of the vehicle. The upper edge portion of the external curtain may be fixed to an external curtain bar disposed in the longitudinal direction of the vehicle.

The door curtain assembly may further include: a first link hinged at opposite end portions thereof to the control knob and the internal curtain bar to couple the control knob with the internal curtain bar; and a second link hinged at opposite end portions thereof to the control knob and the external curtain bar to couple the control knob with the external curtain bar.

An elastic device may be disposed between the control knob and the first link and configured to elastically support the control knob such that a rear end portion of the control knob which is to be manipulated by a user is moved downward.

The control knob may include a locking bar extending from each of opposite sides of the control knob, and a retaining portion protruding from a front end portion of the control knob. The curtain hook may include a locking depression formed to receive the locking bar so that the internal curtain and the external curtain remain extracted, and a locking protrusion to which the retaining portion is selectively locked.

The retaining portion may be formed on the control knob in a shape protruding from the front end portion of the control knob. The locking protrusion may be formed on the curtain hook and configured to receive the retaining portion when an angle of the control knob is adjusted.

The internal curtain may be elastically supported on an internal reel disposed in the door trim such that the internal curtain is wound around the internal reel. The external curtain may be elastically supported on an external reel disposed in the door trim at a position distanced from the internal reel such that the external curtain is wound around the external reel.

The methods and apparatuses of the present invention have other features and advantages which will be apparent from or are set forth in more detail in the accompanying drawings, which are incorporated herein, and the following Detailed Description, which together serve to explain certain principles of the present invention.

It may be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention (s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Hereinafter, a door curtain assembly having a variable screening rate structure according to an exemplary embodiment of the present invention will be described more specifically with reference to the appended drawings.

The door curtain assembly according to an exemplary embodiment of the present invention may include an internal curtain 21 which is provided to be wound in a door trim 10 of a vehicle and has a plurality of patterns; an external curtain 31 which is provided to be wound in the door trim 10 of the vehicle and distanced from the internal curtain 21 and has a plurality of patterns; a control knob 41 to which an upper edge portion of the internal curtain 21 and an upper edge portion of the external curtain 31 are fixed at positions distanced from each other by a predetermined distance, and which is configured to adjust the positions of the internal curtain 21 and the external curtain 31 so that a rate at which the patterns formed in the internal curtain 21 and the patterns formed in the external curtain 31 overlap with each other can be changed, whereby the screening rate can be adjusted; and a curtain hook 51 which is disposed on an upper end portion of a door frame so that the control knob 41 can be locked to the curtain hook 51 in an orientation selected among a plurality of orientations.

The internal curtain 21 may include fabric similar to the material of the door trim 10 of the vehicle, a film, or the like, to allow it to be easily wound or deployed.

The plurality of patterns is formed in the internal curtain 21. The patterns of the internal curtain 21 are formed to have different light transmittances. For example, portions designated by A and B of FIG. 3 may have different light transmittances. The patterns formed in the internal curtain 21 may have the same heights and be formed in the horizontal direction thereof.

A lower edge portion of the internal curtain 21 is wound around an internal reel 22 disposed in the door trim 10 such that the internal curtain 21 can be elastically supported in a direction thereof, in which it is wound around the internal reel 22, when no external force is applied thereto. The configuration in which the internal curtain 21 is disposed with the internal reel 22 is a well-known technique applied to a typical door curtain; therefore, detailed description thereof will be omitted.

The upper edge portion of the internal curtain 21 is fixed to an internal curtain bar 23 disposed in a longitudinal direction of the vehicle. The internal curtain bar 23 provides stiffness to the upper edge portion of the internal curtain 21 made of fabric, a film, or the like to support the internal curtain 21 when the internal curtain 21 is deployed.

The external curtain 31 is configured in the same manner as that of the internal curtain 21. The external curtain 31 is elastically supported to be wound around an external reel 32 disposed in the door trim 10. The upper edge portion of the external curtain 31 is fixed to an external curtain bar 33.

The external curtain 31 also has the plurality of patterns. The patterns are formed to have different light transmittances. The patterns of the external curtain 31 may be horizontal patterns having the same height.

Accordingly, each of the internal curtain 21 and the external curtain 31 has a plurality of patterns. The height of the patterns formed in the internal curtain 21 is the same as or substantially the same as that of the patterns formed in the external curtain 31. The reason for this is to make it possible to adjust the screening rate by changing the overlap rate of the patterns by adjusting the positions of the internal curtain 21 and the external curtain 31 in the vertical direction of the vehicle.

Figure 3:
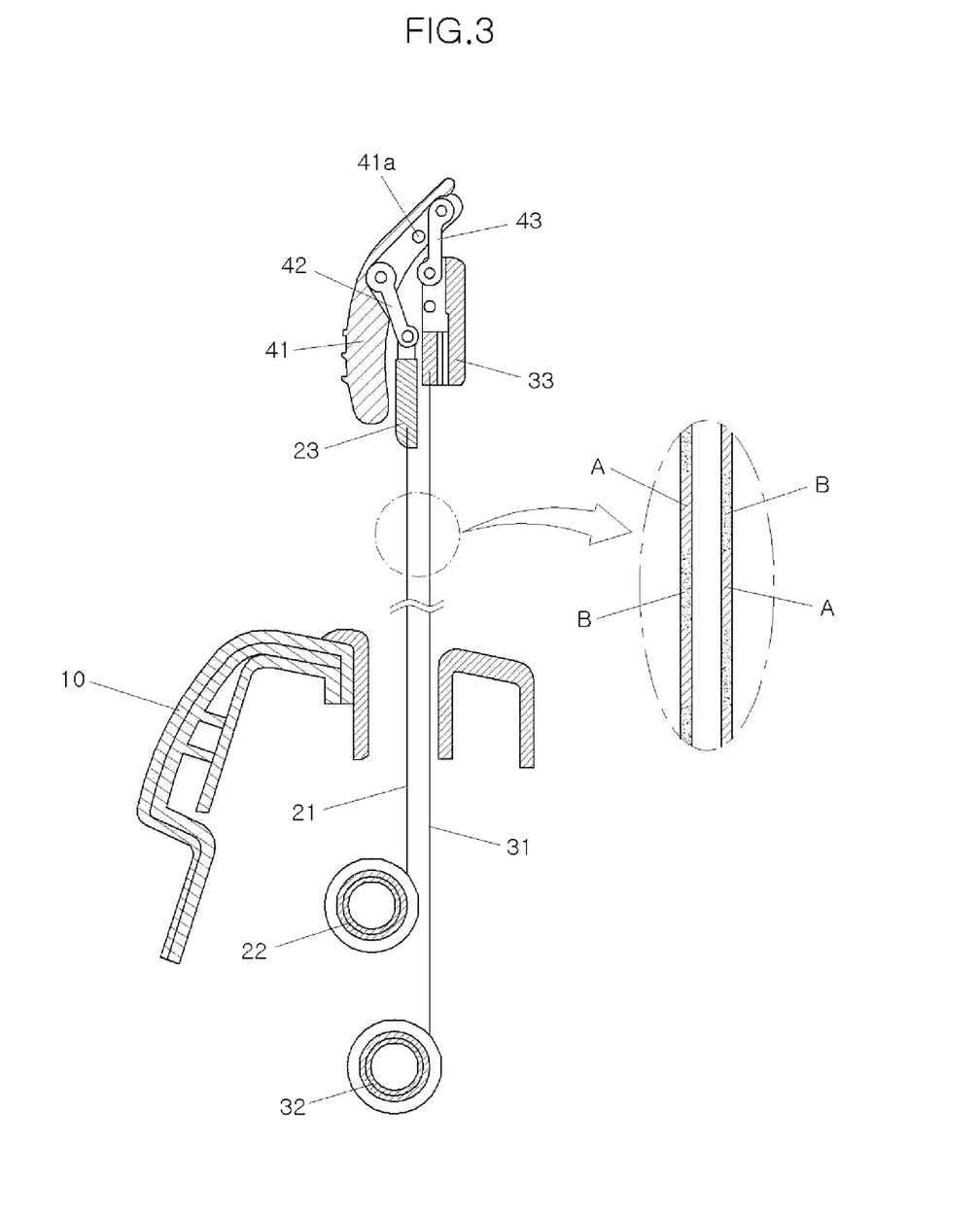
FIG. 3 is a sectional view showing a first state of the door curtain assembly according to an exemplary embodiment of the present invention.

For example, as shown in FIG. 3, if each of the internal curtain 21 and the external curtain 31 has two regions A and B with different light transmittances, the internal curtain 21 and the external curtain 31 may be positioned such that the identical patterns are disposed at the same height or the different patterns are disposed at the same height.

Figure 8:
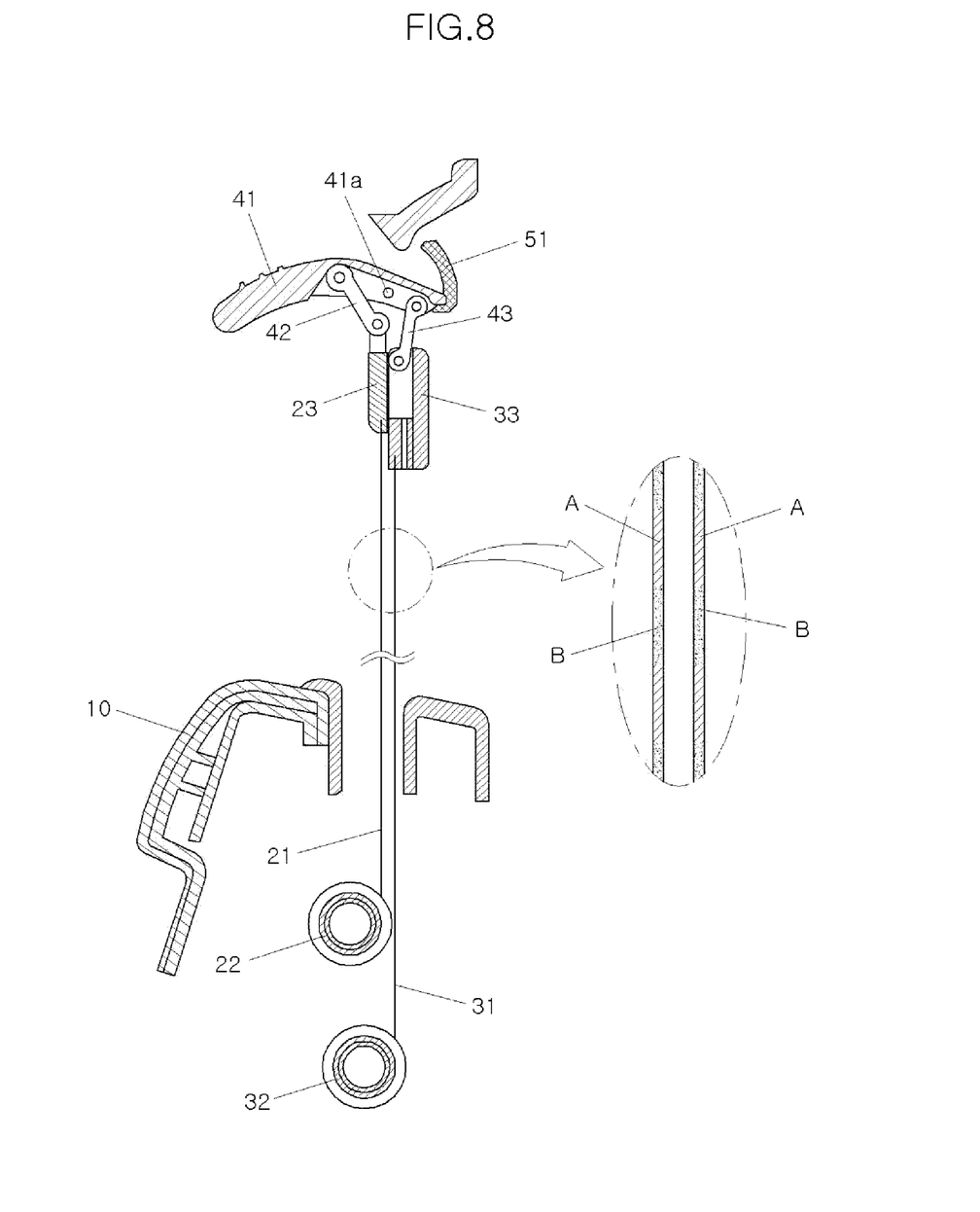
FIG. 8 is a sectional view showing a second state of the door curtain assembly that has been changed in screening rate from the first state, according to an exemplary embodiment of the present invention.

For instance, in FIG. 3, there is illustrated the state in which the different patterns of the internal and external curtains 21 and 31 are disposed at the same height. In FIG. 8, there is illustrated the state in which the identical patterns of the internal and external curtains 21 and 31 are disposed at the same height.

More specifically, on the assumption that the region A is a low transmittance region and the region B is a high transmittance region, as shown in FIG. 3, if the internal curtain 21 and the external curtain 31 are disposed such that the regions of the internal and external curtains 21 and 31 that have different transmittances are disposed at the same height, the regions A having a low transmittance are disposed over the entirety of the window glass. Hence, the amount of light passing through the internal curtain 21 and the external curtain 31 can be reduced. As a result, the amount of sunlight that enters the passenger compartment of the vehicle can be reduced, or the passenger compartment can be prevented from being exposed to the outside, whereby the privacy of the occupant in the vehicle can be secured.

On the other hand, as shown in FIG. 8, if the regions having the same light transmittance are disposed at the same height, light is allowed to pass through the regions B having a high light transmittance, so that the amount of sunlight that enters the passenger compartment of the vehicle can be increased, or the occupant in the passenger compartment can be allowed to see the outside.

The control knob 41 is coupled with the internal curtain bar 23 and the external curtain bar 33. The occupant can use the control knob 41 to extract both the internal curtain 21 wound around the internal reel 22 and the external curtain 31 wound around the external reel 32 and lock the internal and external curtains 21 and 31 to the upper end portion of the door frame.

For this, a locking bar 41*a* extending in the longitudinal direction of the vehicle is formed on opposite sides of the control knob 41. The locking bar 41*a* may be locked to the curtain hook 51 fixed to the upper end portion of the door frame.

In an exemplary embodiment of the present invention, not only can the control knob 41 be used to extract the internal curtain 21 and the external curtain 31 but it can also be used to adjust the positions of the internal curtain 21 and the external curtain 31.

The control knob 41 is provided with a retaining portion 41*b* protruding from a front end portion of the control knob 41. When a fixing angle of the control knob 41 changes, the retaining portion 41*b* enables the control knob 41 to remain fixed at the changed angle.

Two links 42 and 43 are coupled to the control knob 41 on respective opposite sides of the locking bar 41*a*, whereby the internal curtain 21 and the external curtain 31 can be coupled to each other.

More specifically, a first end portion of the first link 42 is coupled to a rear end portion (to be held and manipulated by the hand of a user) of the control knob 41 based on the locking bar 41*a*, and a first end portion of the second link 43 is coupled to a front end portion of the control knob 41. A second end portion of the first link 42 and a second end portion of the second link 43 are respectively coupled to the upper edge portion of the internal curtain 23 and the upper edge portion of the external curtain 33. The control knob 41, the first link 42, the second link 43, and the door trim 10 form a four-bar link structure. When the control knob 41 is manipulated, the first link 42 and the second link 43 are changed in position and orientation, whereby the internal curtain 21 and the external curtain 31 are moved upward or downward and thus controlled in position. In the present way, the positions of the internal and external curtains 21 and 31 are controlled. Consequently, the screening rate of the internal and external curtains 21 and 31 can be adjusted.

Furthermore, the control knob 41 is provided with an elastic member that elastically supports the rear end portion of the control knob 41 toward the first link 42. For example, a torsion spring 44 may be provided as the elastic member. The opposite end portions of the torsion spring 44 are respectively provided on the control knob 41 and the first link 42, whereby the rear end portion of the control knob 41 can be elastically supported toward the first link 42.

The curtain hook 51 is disposed on the upper end portion of the door frame. The curtain hook 51 functions not to fix the control knob 41 such that the internal curtain 21 and the external curtain 31 remain extracted, but also to maintain the angle of the control knob 41.

The curtain hook 51 has a locking depression 52 into which the locking bar 41*a* is received. The locking depression 52 receives the locking bar 41*a* of the control knob 41 that has moved upward, thus preventing the control knob 41 from undesirably moving downward, whereby the internal curtain 21 and the external curtain 31 remain extracted.

Furthermore, the curtain hook 51 has a locking protrusion 53 that may hold the retaining portion 41*b*. The locking protrusion 53 may be formed in a form of a depression which receives the retaining portion 41*b* so that, after the angle of the control knob 41 has been adjusted, the control knob 41 can remain adjusted in angle. When the locking protrusion 53 receives and holds the retaining portion 41*b*, the rear end portion of the control knob 41 can remain moved upward because the force with which the locking protrusion 53 holds the retaining portion 41*b* is greater than the elastic force of the torsion spring 44.

The operation of the door curtain assembly according to an exemplary embodiment of the present invention having the above-mentioned configuration will be described below.

Figure 2:
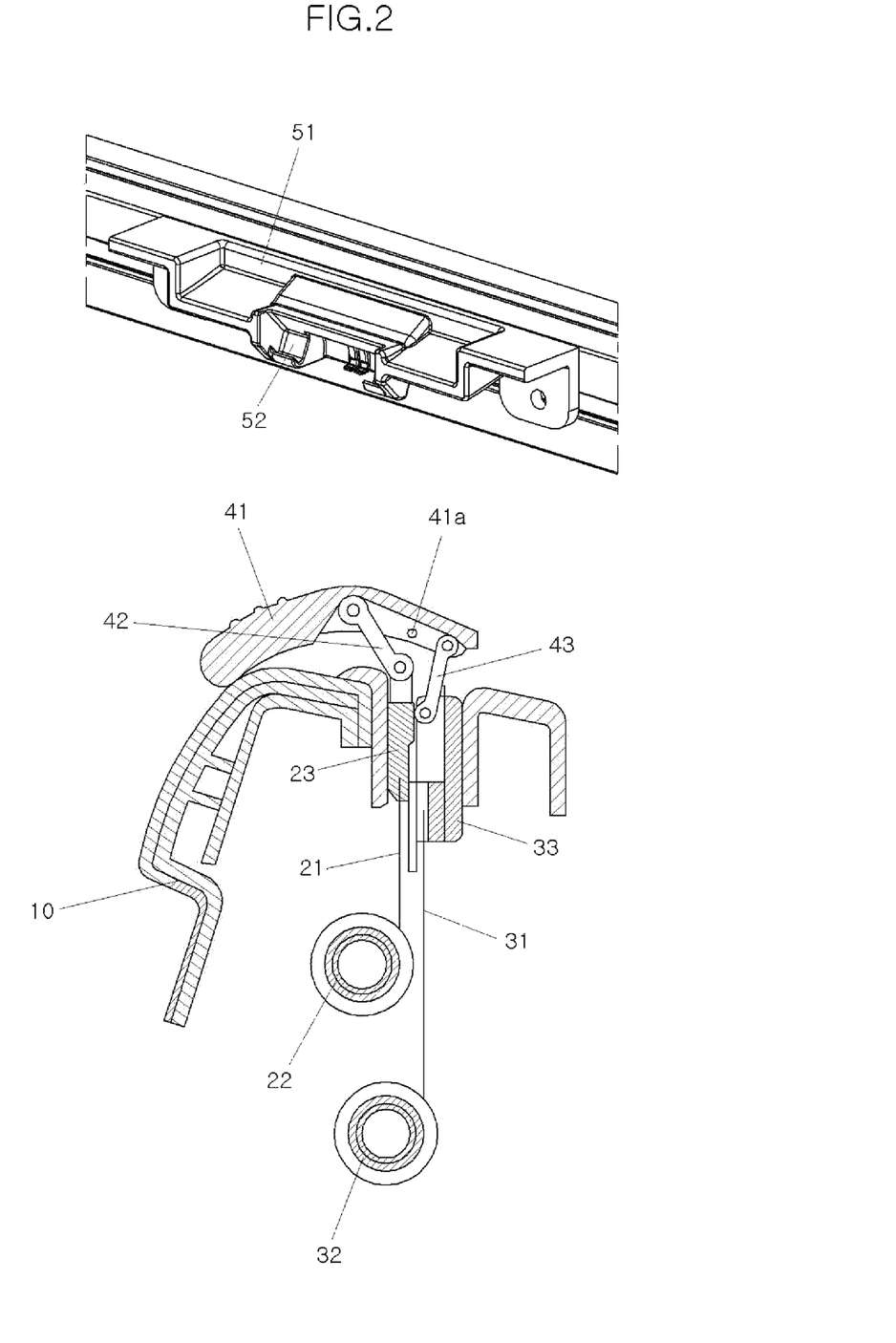
FIG. 2 is a schematic view illustrating a door curtain assembly having a variable screen rate structure according to an exemplary embodiment of the present invention.

As shown in FIG. 2, when the door curtain assembly according to an exemplary embodiment of the present invention is not in used, the control knob 41 remains disposed at the lowermost position, and the internal curtain 21 and the external curtain 31 do not screen the window glass.

If, to block light, the occupant moves the control knob 41 upward to extract the internal curtain 21 and the external curtain 31 from the door trim 10 and then lock the control knob 41 to the curtain hook 51, the window glass remains screened by the internal curtain 21 and the external curtain 31.

More specifically, when the occupant moves the control knob 41 upward and locks the control knob 41 to the curtain hook 51, the locking bar 41*a* of the control knob 41 is received into the locking depression 52 of the curtain hook 51. Thus, the control knob 41 remains fixed to the upper end portion of the door frame so that the internal curtain 21 and the external curtain 31 screen the window glass.

Here, unless the occupant separately manipulates the door curtain assembly, the door curtain assembly is in the first state in which the rear end portion (to be held by the hand) of the control knob 41 is disposed adjacent to the internal curtain 21.

Figure 4:
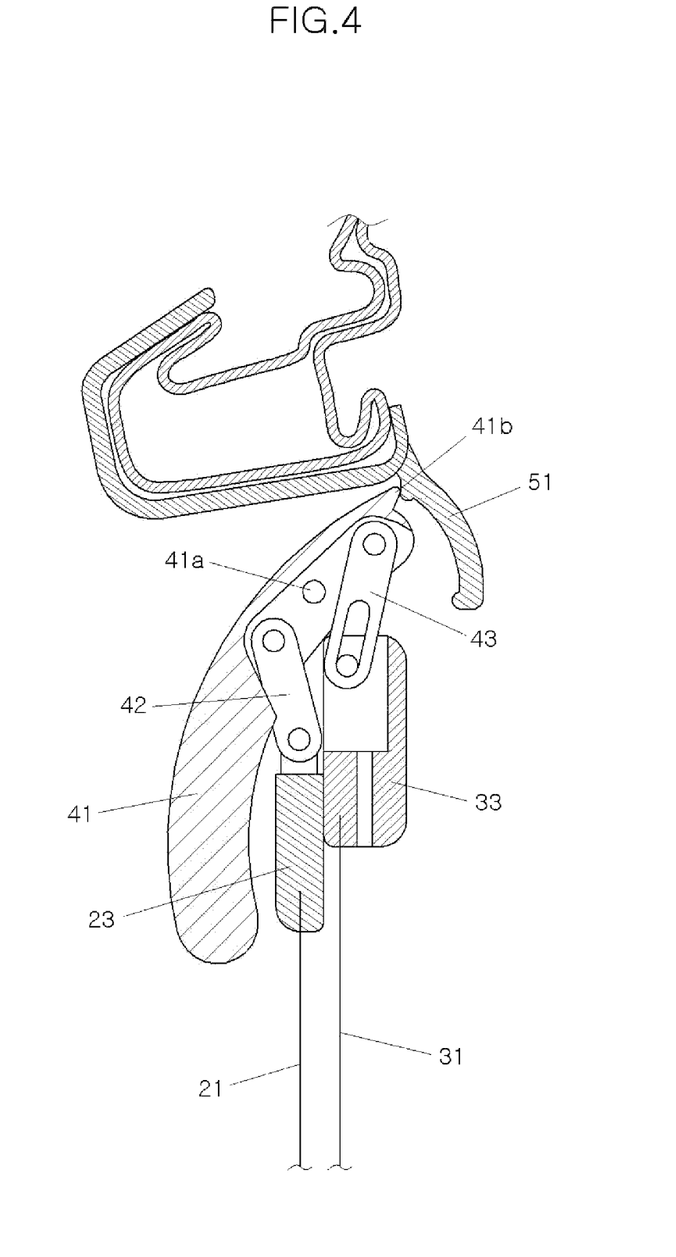
FIG. 4 is a sectional view showing the states of a knob and a curtain hook in the first state of the door curtain assembly according to an exemplary embodiment of the present invention.
Figure 5:
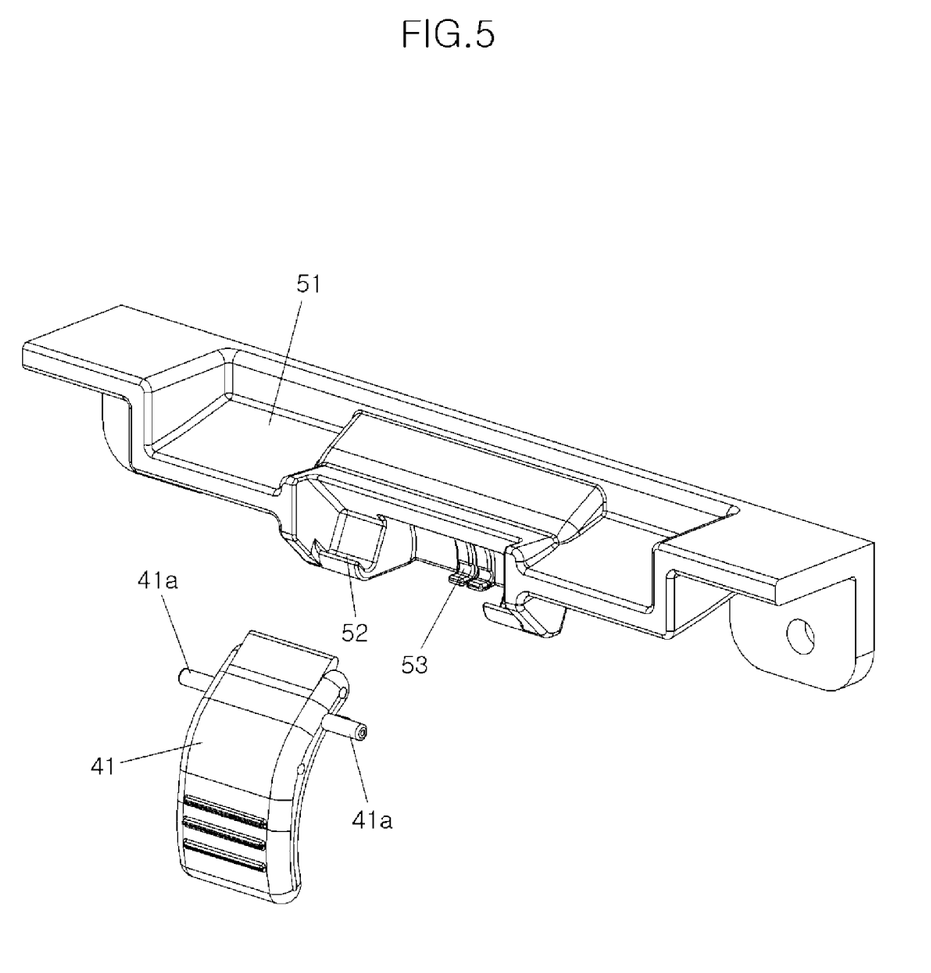
FIG. 5 is an enlarged perspective view showing the knob and the curtain hook of the door curtain assembly according to an exemplary embodiment of the present invention.
Figure 6:
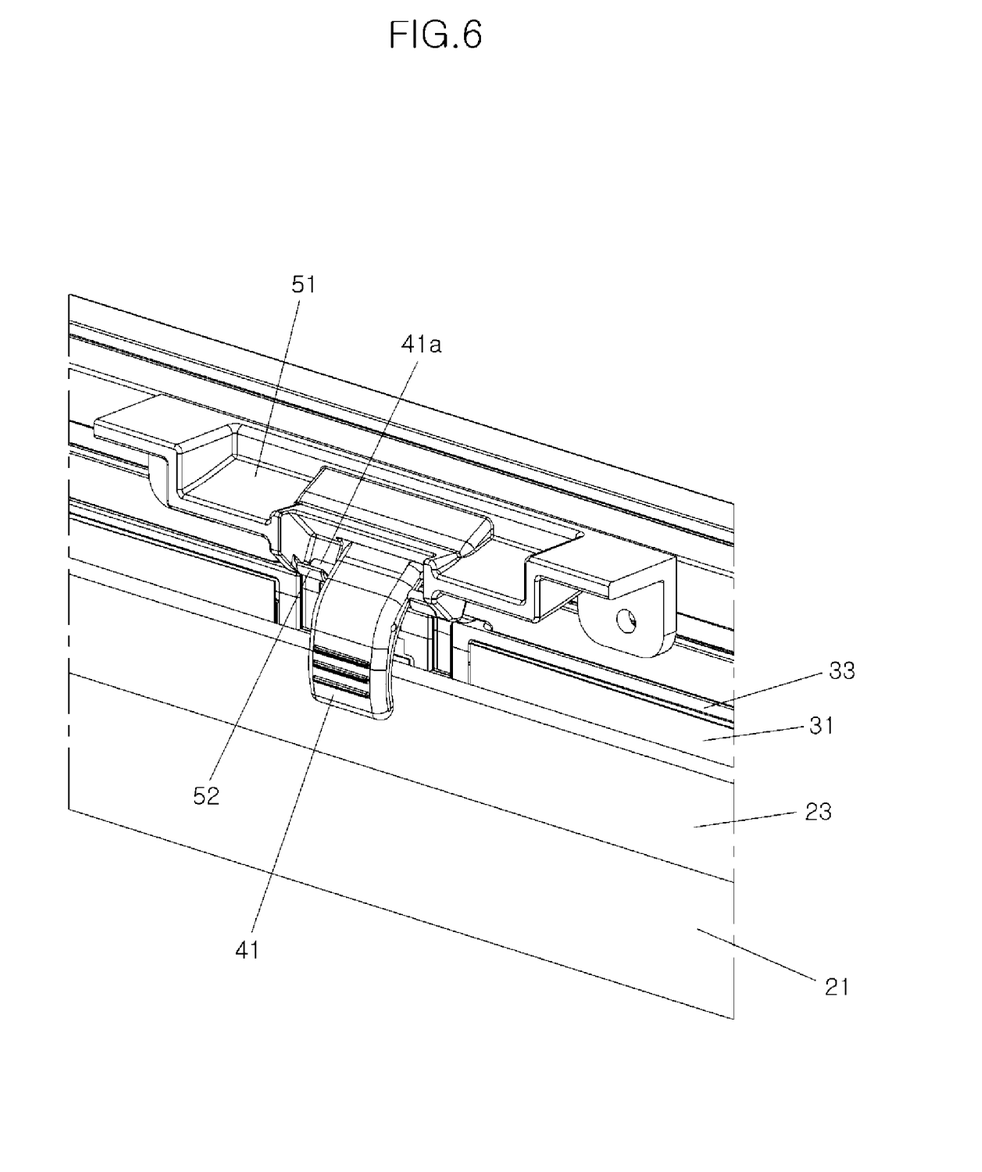
FIG. 6 is a perspective view showing a structure for locking the knob to the curtain hook in the first state of the door curtain assembly according to an exemplary embodiment of the present invention.
Figure 7:
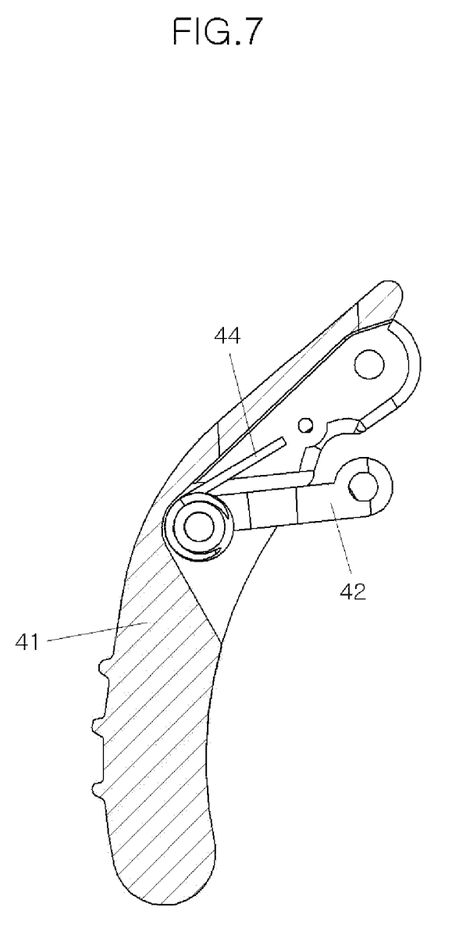
FIG. 7 is an enlarged sectional view illustrating a control link of the door curtain assembly according to an exemplary embodiment of the present invention.

In the first state, as shown in FIGS. 4 and 6, the retaining portion 41b is not locked to the locking protrusion 53 of the curtain hook 51. Furthermore, as shown in FIG. 7, the rear end portion of the control knob 41 remains disposed adjacent to the internal curtain 21 by the elastic force of the torsion spring 44.

In the first state, because the internal curtain 21 and the external curtain 31 are disposed such that different patterns of the internal and external curtains 21 and 31 are located at the same height, the regions A having a relatively low light transmittance cover the overall surface of the window glass, so that the screening rate is maximized, thus minimizing the amount of light that passes through the internal and external curtains 21 and 31. Consequently, not only can sunlight be prevented from being incident into the passenger compartment of the vehicle, but the passenger compartment can also be invisible to the outside to secure the privacy of the occupant.

When the occupant adjusts the angle at which the control knob 41 is fixed to the curtain hook 51, the positions of the internal and external curtains 21 and 31 are controlled, whereby the screening rate can be changed.

If the occupant moves the rear end portion of the control knob 41 upward, the control knob 41 rotates around the locking bar 41a. When the control knob 41 completely rotates upward, the retaining portion 41b is received in the locking protrusion 53, and the control knob 41 enters the second state in which the angle thereof has been changed from the first state.

Figure 9:
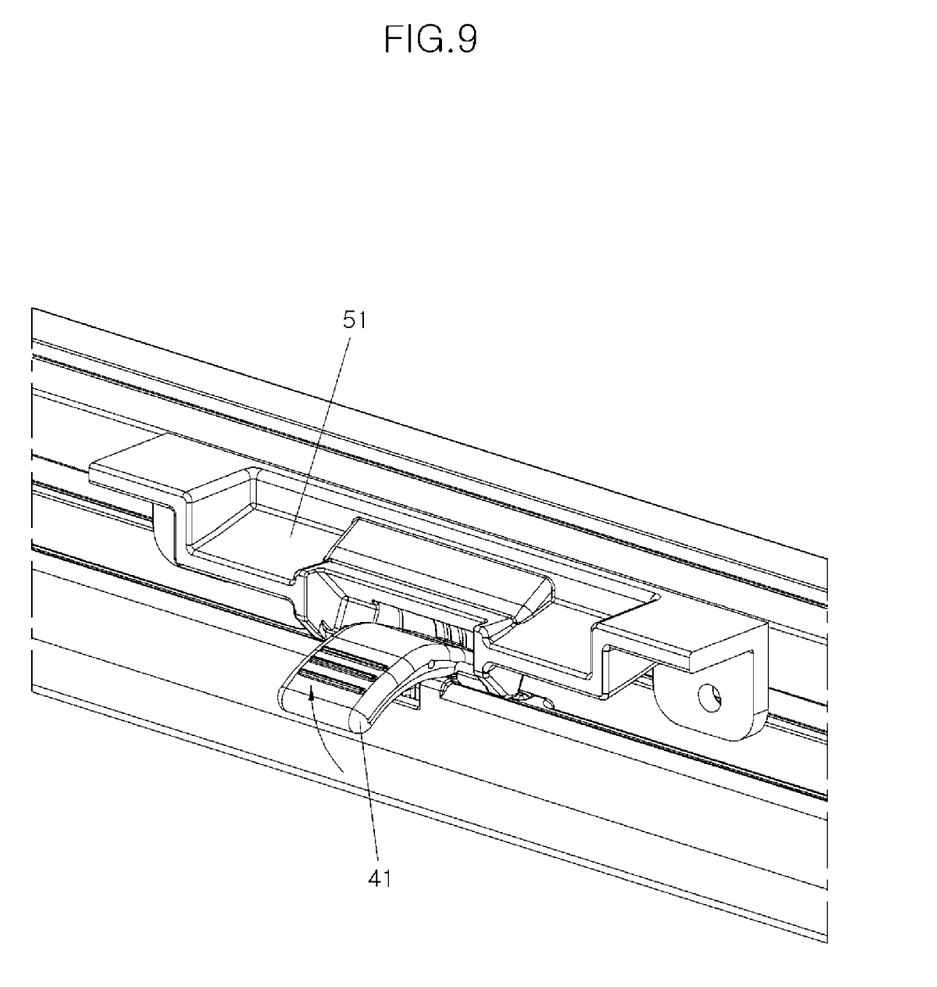
FIG. 9 is a perspective view showing a structure for locking the knob to the curtain hook in the second state of the door curtain assembly according to an exemplary embodiment of the present invention.
Figure 10:
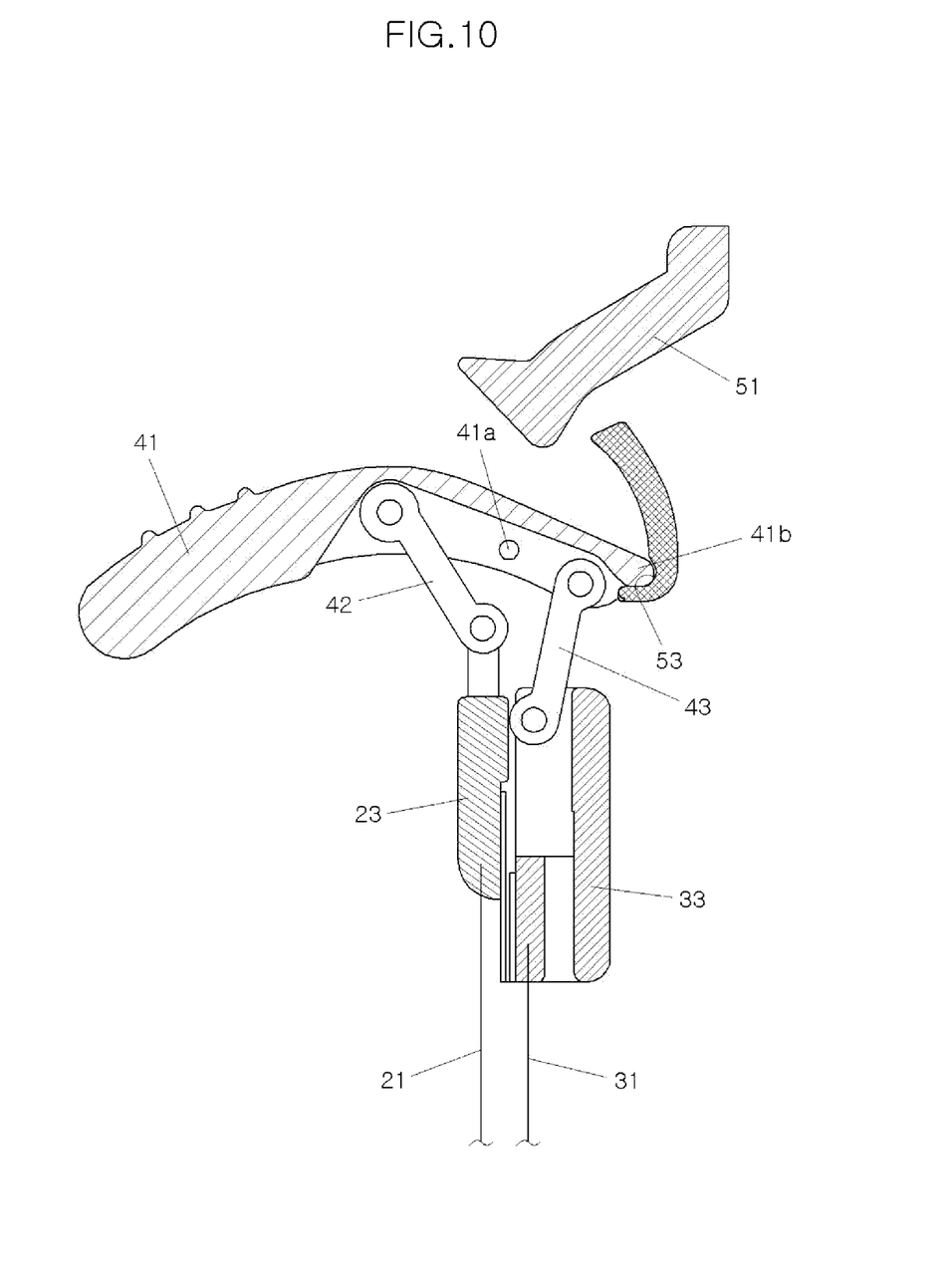
FIG. 10 is a sectional view showing the knob and the curtain hook in the second state of the door curtain assembly according to an exemplary embodiment of the present invention.

Since the force with which the locking protrusion 53 holds the retaining portion 41b is greater than the elastic force of the torsion spring 44, the control knob 41 is maintained in the second state shown in FIG. 8 and FIG. 9.

Here, when the control knob 41 is rotated such that the control knob 41 is changed from the first state to the second state, the first link 42 is moved upward, and the second link is moved downward. Since the control knob 41, the first link 42, the second link 43, and the door trim 10 form a four-bar link structure, the positions and the orientations of the first and second links 42 and 43 are changed by the rotation of the control knob 41. The first link 42 is moved upward, and the second link 43 is moved downward.

Consequently, while the internal curtain 21 coupled to the first link 42 is moved upwards from the state of FIG. 3 and the external curtain 31 coupled to the second link 43 is moved downwardly from the state of FIG. 3, the positions of the internal and external curtains 21 and 31 are adjusted.

In the present way, if the positions of the internal and external curtains 21 and 31 are adjusted, the regions of the internal and external curtains 21 and 31 that have the same light transmittance are disposed at the same height, so that sunlight is allowed to enter the compartment through the regions B having a low light transmittance, or the occupant is allowed to see the outside.

If the occupant applies force to the rear end portion of the control knob 41 downward so that the control knob 41 enters the state of FIG. 3, the control knob 41 is rotated downward when the force with which the control knob 41 is manipulated is greater than the force with which the locking protrusion 53 holds the retaining portion 41b. As a result, the internal curtain 21 is moved downward, and the external curtain 31 is moved upward, whereby the screening rate is adjusted.

Furthermore, if there is no need to screen the window glass using the internal curtain 21 and the external curtain, the occupant removes the control knob 41 from the curtain hook 51 and allows the internal and external curtains 21 and 31 to be wound around the internal reel 22 and the external reel 32.

As described above, in a door curtain assembly having a variable screening rate structure according to an exemplary embodiment of the present invention, a rate at which patterns formed in door curtains overlap each other can be controlled by adjusting the angle of a knob which is used to deploy the door curtains, whereby the screening rate of the door curtains can be varied.

For convenience in explanation and accurate definition in the appended claims, the terms "upper", "lower", "internal", "outer", "up", "down", "upper", "lower", "upwards", "downwards", "front", "rear", "back", "inside", "outside", "inwardly", "outwardly", "internal", "external", "internal", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described to explain certain principles of the invention and their practical application, to enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A door curtain assembly having a variable screening rate structure, the door curtain assembly comprising:
   an internal curtain provided to be wound in a door trim of a vehicle, with a plurality of patterns formed in the internal curtain;
   an external curtain provided to be wound in the door trim of the vehicle and distanced from the internal curtain, with a plurality of patterns formed in the external curtain;
   a control knob to which an upper edge portion of the internal curtain and an upper edge portion of the external curtain are fixed at positions spaced from each other with a predetermined distance, the control knob being configured to adjust positions of the internal curtain and the external curtain so that a rate at which the patterns formed in the internal curtain and the patterns formed in the external curtain overlap with each other is changed, such that a screening rate is adjusted; and
   a curtain hook disposed on an upper end portion of a door frame, wherein the control knob is locked to the curtain hook in an orientation selected among a plurality of orientations,
   wherein the control knob includes a locking bar extending from each of opposite sides of the control knob, and a retaining portion protruding from a front end portion of the control knob.

2. The door curtain assembly of claim 1, wherein the patterns formed in the internal curtain are identical with the patterns formed in the external curtain.

3. The door curtain assembly of claim 1, wherein the patterns formed in each of the internal curtain and the external curtain include patterns having different light transmittances and alternating with each other.

4. The door curtain assembly of claim 1,
wherein the internal curtain is elastically supported on an internal reel disposed in the door trim and the internal curtain is wound around the internal reel, and
wherein the external curtain is elastically supported on an external reel disposed in the door trim at a position distanced from the internal reel and the external curtain is wound around the external reel.

5. The door curtain assembly of claim 1,
wherein the upper edge portion of the internal curtain is fixed to an internal curtain bar disposed in a longitudinal direction of the vehicle, and
wherein the upper edge portion of the external curtain is fixed to an external curtain bar disposed in the longitudinal direction of the vehicle.

6. The door curtain assembly of claim 5, further including:
a first link hinged at opposite end portions thereof to the control knob and the internal curtain bar to couple the control knob with the internal curtain bar; and
a second link hinged at opposite end portions thereof to the control knob and the external curtain bar to couple the control knob with the external curtain bar.

7. The door curtain assembly of claim 6, wherein an elastic device is disposed between the control knob and the first link and configured to elastically support the control knob such that a rear end portion of the control knob which is configured to be manipulated by a user is moved downwards therefrom.

8. The door curtain assembly of claim 7,
wherein the curtain hook includes a locking depression formed to receive the locking bar so that the internal curtain and the external curtain remain extracted, and a locking protrusion to which the retaining portion is selectively locked.

9. The door curtain assembly of claim 8,
wherein the retaining portion is formed on the control knob to protrude from the front end portion of the control knob, and
wherein the locking protrusion is formed on the curtain hook and configured to receive the retaining portion when an angle of the control knob is adjusted.

* * * * *